United States Patent [19]

Thomas et al.

[11] Patent Number: 5,666,254
[45] Date of Patent: Sep. 9, 1997

[54] VOLTAGE SENSING OVERCURRENT PROTECTION CIRCUIT

[75] Inventors: Brian Thomas, San Francisco; Hugh Duffy, Cupertino, both of Calif.

[73] Assignee: Raychem Corporation, Menlo Park, Calif.

[21] Appl. No.: 564,457

[22] Filed: Nov. 29, 1995

[51] Int. Cl.⁶ ............................................. H02H 3/00
[52] U.S. Cl. ................................................ 361/8; 361/13
[58] Field of Search ............................. 361/2–11, 13, 361/54, 55, 57, 58, 187

[56] References Cited

U.S. PATENT DOCUMENTS

| | | | |
|---|---|---|---|
| 3,241,026 | 3/1966 | Andrich | 318/442 |
| 3,249,810 | 5/1966 | Strom et al. | 317/11 |
| 3,488,761 | 1/1970 | Ito et al. | 337/221 |
| 3,529,210 | 9/1970 | Toshio et al. | 361/58 |
| 3,935,511 | 1/1976 | Boulanger et al. | 361/58 |
| 4,070,641 | 1/1978 | Khalid | 338/61 |
| 4,071,836 | 1/1978 | Cook et al. | 335/195 |
| 4,237,441 | 12/1980 | van Konynenburg et al. | 338/22 |
| 4,238,812 | 12/1980 | Middleman et al. | 361/106 |
| 4,315,237 | 2/1982 | Middleman et al. | 338/22 R |
| 4,317,027 | 2/1982 | Middleman et al. | 219/553 |
| 4,426,633 | 1/1984 | Taylor | 338/25 |

(List continued on next page.)

FOREIGN PATENT DOCUMENTS

| | | |
|---|---|---|
| 872089 | 3/1979 | Belgium . |
| 2019925 | 12/1990 | Canada . |
| 0424283 | 4/1991 | European Pat. Off. . |
| 0 474 611 A2 | 3/1992 | European Pat. Off. ......... H02M 7/06 |
| 2653593 | 4/1991 | France . |
| 2928786 | 5/1981 | Germany . |
| 3544647 | 6/1987 | Germany . |
| 59-46730 | 3/1984 | Japan . |
| 59-49127 | 3/1984 | Japan . |
| 61-22719 | 1/1986 | Japan . |
| 61-22720 | 1/1986 | Japan . |
| 4-351825 | 12/1992 | Japan . |
| 5-6725 | 1/1993 | Japan . |
| 5-6723 | 1/1993 | Japan . |
| 5-6720 | 1/1993 | Japan . |
| 1172718 | 1/1988 | United Kingdom . |
| WO93/07667 | 4/1993 | WIPO . |

*Primary Examiner*—Jeffrey A. Gaffin
*Assistant Examiner*—Ronald W. Leja
*Attorney, Agent, or Firm*—Herbert G. Burkard; Bruce M. Bertram; Timothy H. P. Richardson

[57] ABSTRACT

An overcurrent protection system which will give a rapid response to overcurrents which cause a reduction in the voltage across the load, e.g. a partial or complete short across the load, and is particularly suitable for protecting circuits against relatively small overcurrents, comprising: a circuit interruption element which, in the operating circuit, is connected in series between the electrical power supply and the electrical load, and which has (1) a closed state which permits the flow of a normal current, $I_{NORMAL}$, through the circuit interruption element, and (2) an open state which permits the flow of at most a reduced current, substantially less than $I_{NORMAL}$, through the circuit interruption element; a control element which, in the operating circuit, is connected in parallel with the load, and which has (1)(i) an on state, when the voltage across the control element is a normal voltage, $V_{NORMAL}$, and (ii) is converted to an off state, when the voltage across the control element falls to a value $V_{FAULT}$, or less, and (2) is functionally linked to the circuit interruption element so that when the control element is in the on state, the circuit interruption element is in the closed state, and when the control element is in the off state, the circuit interruption element is in the open state; and a bypass element which (1) is connected in parallel with the circuit interruption element, and (2) has (i) a start-up state such that, if the circuit interruption element is in the fault state and a current $I_{NORMAL}$ is passed through the bypass element, the voltage across the control element is greater than $V_{FAULT}$, and (ii) a stopped state such that if the circuit interruption element is in the fault state as a result of the voltage across the control element having fallen to a value $V_{FAULT}$ or less, the current through the bypass element is such that the voltage across the control element remains at a value of $V_{FAULT}$ or less.

12 Claims, 2 Drawing Sheets

U.S. PATENT DOCUMENTS

| | | | |
|---|---|---|---|
| 4,445,079 | 4/1984 | DeFilippis et al. | 318/792 |
| 4,485,283 | 11/1984 | Hurtle | 200/144 R |
| 4,545,926 | 10/1985 | Fouts et al. | 252/511 |
| 4,583,146 | 4/1986 | Howell | 361/13 |
| 4,689,475 | 8/1987 | Kleiner et al. | 219/553 |
| 4,724,417 | 2/1988 | Au et al. | 338/22 R |
| 4,724,504 | 2/1988 | Prouty | 361/165 |
| 4,774,024 | 9/1988 | Deep et al. | 252/511 |
| 4,780,598 | 10/1988 | Fahey et al. | 219/511 |
| 4,800,253 | 1/1989 | Kleiner et al | 219/553 |
| 4,808,965 | 2/1989 | Cenky | 337/408 |
| 4,816,958 | 3/1989 | Beibel et al. | 361/93 |
| 4,845,838 | 7/1989 | Jacobs et al. | 29/671 |
| 4,857,880 | 8/1989 | Au et al. | 338/22 R |
| 4,859,836 | 8/1989 | Lunk et al. | 219/548 |
| 4,901,186 | 2/1990 | Tennant et al. | 361/106 |
| 4,907,340 | 3/1990 | Fang et al. | 29/610.1 |
| 4,910,631 | 3/1990 | Murphy | 361/96 |
| 4,924,074 | 5/1990 | Fang et al. | 219/548 |
| 4,935,156 | 6/1990 | van Konynenburg et al. | 219/553 |
| 4,967,176 | 10/1990 | Horsma et al. | 338/22 R |
| 5,049,850 | 9/1991 | Evans | 338/22 R |
| 5,089,801 | 2/1992 | Chan et al. | 338/22 R |
| 5,254,816 | 10/1993 | Shutoh et al. | 200/144 |
| 5,378,407 | 1/1995 | Chandler et al. | 252/513 |
| 5,428,195 | 6/1995 | Arnold | 218/1 |

VOLTAGE SENSING OVERCURRENT PROTECTION CIRCUIT

RELATED APPLICATIONS

This application is an application under 35 USC 111(a) and claims priority under 35 USC 119 from Provisional Application Ser. No. 60/003,731, filed Sep. 14, 1995 under 35 USC 111(b).

This application is related to commonly assigned provisional application Ser. No. 60/003,733, filed Sep. 14, 1995, now abandoned under 35 USC 111(b), commonly assigned provisional application Ser. No. 60/003,732, filed Sep. 14, 1995, now abandoned under 35 USC 111(b), and commonly assigned provisional application Ser. No. 60/003,743, filed Sep. 14, 1995, now abandoned under 35 USC 111(b), the disclosures of which are incorporated herein by reference for all purposes.

This application is related to commonly assigned U.S. patent application Ser. No. 08/564,465, commonly assigned U.S. patent application Ser. No. 08/564,831, and commonly assigned U.S. patent application Ser. No. 08/564,495 which are being filed on the same day as this application, the disclosures of which are incorporated herein by reference for all purposes.

BACKGROUND OF THE INVENTION

1. Field of the Invention

This invention relates to electrical circuit overcurrent protection.

2. Introduction to the Invention

PTC circuit protection devices are well known. The device is placed in series with a load, and under normal operating conditions is in a low temperature, low resistance state. However, if the current through the PTC device increases excessively, and/or the ambient temperature around the PTC device increases excessively, and/or the normal operating current is maintained for more than the normal operating time, then the PTC device will be "tripped," i.e. converted to a high temperature, high resistance state such that the current is reduced substantially. Generally, the PTC device will remain in the tripped state, even if the current and/or temperature return to their normal levels, until the PTC device has been disconnected from the power source and allowed to cool. Particularly useful PTC devices contain a PTC element which is composed of a PTC conductive polymer, i.e. a composition which comprises (1) an organic polymer, and (2) dispersed, or otherwise distributed, in the polymer, a particulate conductive filler, preferably carbon black. PTC conductive polymers and devices containing them are described, for example in U.S. Pat. Nos. 4,237,441, 4,238,812, 4,315,237, 4,317,027, 4,426,633, 4,545,926, 4,689,475, 4,724,417, 4,774,024, 4,780,598, 4,800,253, 4,845,838, 4,857,880, 4,859,836, 4,907,340, 4,924,074, 4,935,156, 4,967,176, 5,049,850, 5,089,801 and 5,378,407, the disclosures of which are incorporated herein by reference for all purposes.

A limitation on the known uses of PTC protection devices is that if the overcurrent is relatively small, e.g. up to a few times the normal circuit current, it can take a relatively long time to convert the PTC device into its tripped state.

SUMMARY OF THE INVENTION

We have discovered a new overcurrent protection system which will give a rapid response to overcurrents which cause a reduction in the voltage across the load, e.g. a partial or complete short across the load, and is particularly suitable for protecting circuits against relatively small overcurrents. In the new system, a control element is placed in parallel with the load. Therefore, when the voltage across the load drops, so also does the voltage across the control element. The control element is functionally linked to a circuit interruption element which is in series with the load, so that, when the voltage across the control element drops, the circuit interruption element is changed from a relatively conductive state to a relatively non-conductive state (including a completely open state). The system also includes a bypass element which is in parallel with the circuit interruption element. The bypass element is required so that, when the circuit is just switched on, current can pass through to the circuit and energize the control element, which then converts the circuit interruption element to the relatively conductive state. The bypass element must, however, be such that if a fault converts the circuit interruption element to the relatively non-conductive state, the resultant current through the bypass element changes the bypass element so that the voltage across the control element remains low enough to maintain the circuit interruption element in the relatively non-conductive state.

In a preferred aspect, this invention provides an electrical system which can be connected between an electrical power supply and an electrical load to form an operating circuit, and which when so connected protects the circuit from overcurrents, which system comprises:

a. a circuit interruption element which, in the operating circuit, is connected in series between the electrical power supply and the electrical load, and which has
   (1) a closed state which permits the flow of a normal current, $I_{NORMAL}$, through the circuit interruption element, and
   (2) an open state which permits the flow of at most a reduced current, substantially less than $I_{NORMAL}$, through the circuit interruption element;

b. a control element which, in the operating circuit, is connected in parallel with the load, and which has
   (1) (i) an on state, when the voltage across the control element is a normal voltage, $V_{NORMAL}$, and
   (ii) is converted to an off state, when the voltage across the control element falls to a value $V_{FAULT}$, or less; and
   (2) is functionally linked to the circuit interruption element so that when the control element is in the on state, the circuit interruption element is in the closed state, and when the control element is in the off state, the circuit interruption element is in the open state; and c. a bypass element which
   (1) has
      (i) a start-up state such that, if the circuit interruption element is in the fault state and a current $I_{NORMAL}$ is passed through the bypass element, the voltage across the control element is greater than $V_{FAULT}$, and
      (ii) a stopped state such that if the circuit interruption element is in the fault state as a result of the voltage across the control element having fallen to a value $V_{FAULT}$ or less, the current through the bypass element is such that the voltage across the control element remains at a value of $V_{FAULT}$ or less.

In preferred embodiments of the invention:

1. The circuit interruption element is a set of relay contacts which are normally open, and the control element is a relay coil which, when energized, closes the relay contacts, and which, when deenergized, allows the contacts to open.

2. The circuit interruption dement is a field effect transistor (FET), comprising a gate, a source, and a drain, which (i) will allow the normal circuit current, $I_{NORMAL}$, to pass when the gate voltage of the FET is a normal gate voltage, and (ii) will switch to permit the flow of at most a reduced current, substantially less than $I_{NORMAL}$, when the gate voltage of the FET falls below the normal gate voltage by a predetermined gate voltage amount.

3. The bypass element is a PTC device, preferably a polymeric PTC device.

In a system combining features (1) and (3) above, during normal circuit operation, the relay coil is energized, thereby closing the contacts. In case of an undervoltage, the relay coil deenergizes, opening the contacts. Current is diverted to the PTC device which trips to its high resistance state. The combination of the PTC device and the mechanical contacts permits the use of contacts which are rated to interrupt the overcurrent, but at a voltage substantially less than the normal circuit voltage. The combination also permits the use of a PTC device which is rated to trip at a current level which is substantially less than the normal circuit current.

In a system combining features (2) and (3) above, a field effect transistor (FET), or other solid state switch, is connected in parallel with the PTC device, and the parallel combination is series connected in a line of the circuit to be protected. A voltage divider circuit, or other voltage-sensing device, is connected across the load. The voltage divider circuit controls the gate voltage of the FET. During normal circuit operation, the gate voltage of the FET biases the FET on, to the conducting state. In case of an undervoltage, the FET turns off, diverting the current to the PTC. This causes the PTC to trip to the high resistance state. The solid state arrangement has an advantage over the relay arrangement in that the voltage divider can be selected to present a much higher impedance than that of the relay coil, thereby consuming much less power than that consumed by the relay coil. The solid state arrangement has the additional potential advantages of longer life, lower cost and smaller size.

BRIEF DESCRIPTION OF THE DRAWINGS

The invention is illustrated in the accompanying drawings, in which like components are given the same reference numerals in each FIG. in which they appear, and in which.

DETAILED DESCRIPTION OF THE INVENTION

Figure 1:
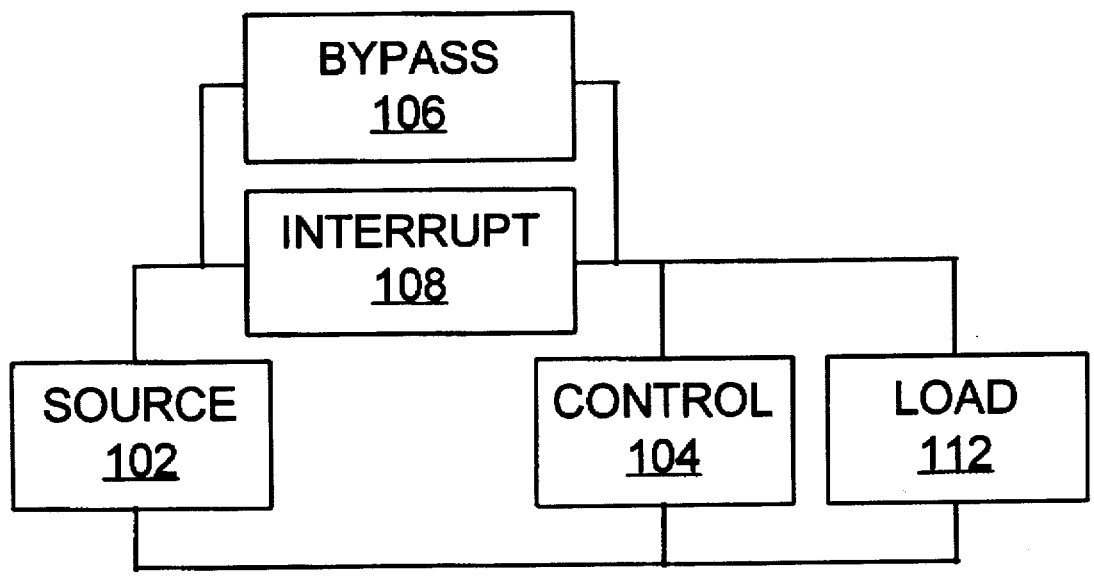
FIG. 1 shows a block diagram depicting general overcurrent protection functions performed by electrical components in overcurrent protection circuits of this invention.
Figure 2:
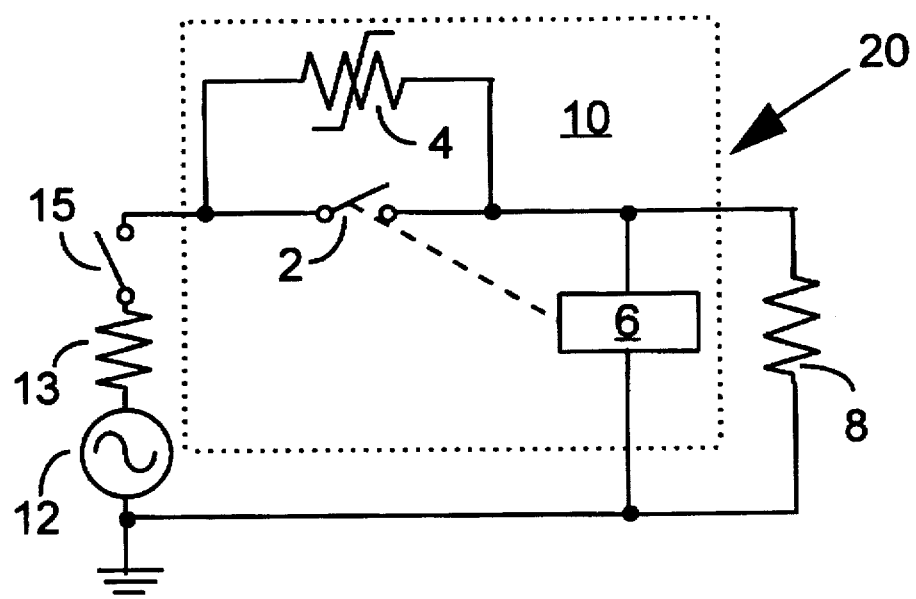
FIGS. 2 to 4 show circuits of the invention.

Five operational elements depicted in FIG. 1 are a source 102, a control element 104, a bypass element 106, an interrupt element 108 and a load 112. The source 102 provides the electrical power to the circuit, and the load 112 performs the intended purpose of the circuit. The control, interrupt, and bypass elements work cooperatively to provide overcurrent protection FIG. 2 shows an electrical circuit 20, comprising a power source 12, a source impedance 13, a switch 15, a load 8, and an overcurrent protection system 10. The overcurrent protection system 10 comprises an interrupt element which is a normally open set of relay contacts 2, a PTC device 4 connected in parallel with the relay contacts, and a voltage sensing relay coil 6 connected in parallel across the load 8. In normal operation, when the power source 12 is connected by closing the switch 15, the relay contacts 2 are initially open, but the relay coil 6 becomes energized via current flowing through the PTC device 4, thereby closing the relay contacts 2. With the relay contacts 2 closed, the PTC device 4 does not carry the normal circuit current. If a short develops in the load 8, the current in the circuit 20 increases, and the voltage across the load 8 and the relay coil 6 is reduced, thereby deenergizing the relay coil 6, and opening the relay contacts 2. The overcurrent then flows through the PTC device 4 which then trips to its high resistance state and reduces the current to a safe level.

The PTC device 4 generally has a hold current which is low relative to the normal current in the circuit. For example, consider a circuit 20 in which the normal load current is 15 amps at 90 volts; the relay coil 6 energizes at 60 volts and deenergizes at 40 volts, and the PTC device 4 has a hold current of 1 amp. When power is initially applied, 15 amps flows through the PTC device 4 for a few milliseconds until the relay coil 6 energizes. The PTC device 4 does not trip in the short time. With the relay coil 6 energized, the relay contacts 2 close, taking the PTC device "out of the circuit." If a short was placed over the load 8, and the current became about 30 amps, the voltage across the relay coil 6 would be close to zero and the relay contacts would open, placing the one amp PTC device 4 into the 30 amp circuit. The PTC device 4 would then trip to its high resistance state and reduce the current to a very small value.

The presence of the PTC device 4 in parallel with the relay contacts 2 permits the use of relay contacts 2 which are rated to carry the normal circuit current, and to interrupt the maximum overcurrent at a voltage which is less than the normal applied voltage. With the PTC device 4 having a low resistance state resistance of $R_{PTC\ LOW}$, and the circuit 20 having a maximum overcurrent with the load 8 shorted of $I_{MAX\ OVERCURRENT}$, then the relay contacts 2 are rated to interrupt $I_{MAX\ OVERCURRENT}$ at a voltage less than $R_{PTC\ LOW} \times I_{MAX\ OVERCURRENT}$.

Figure 3:
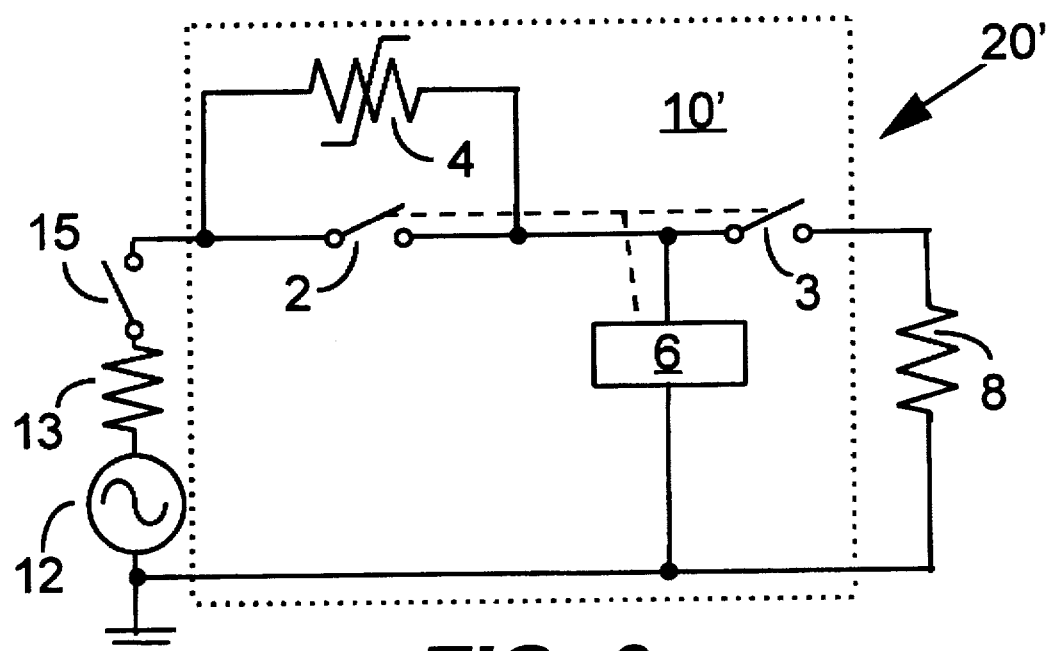
Figure 4:
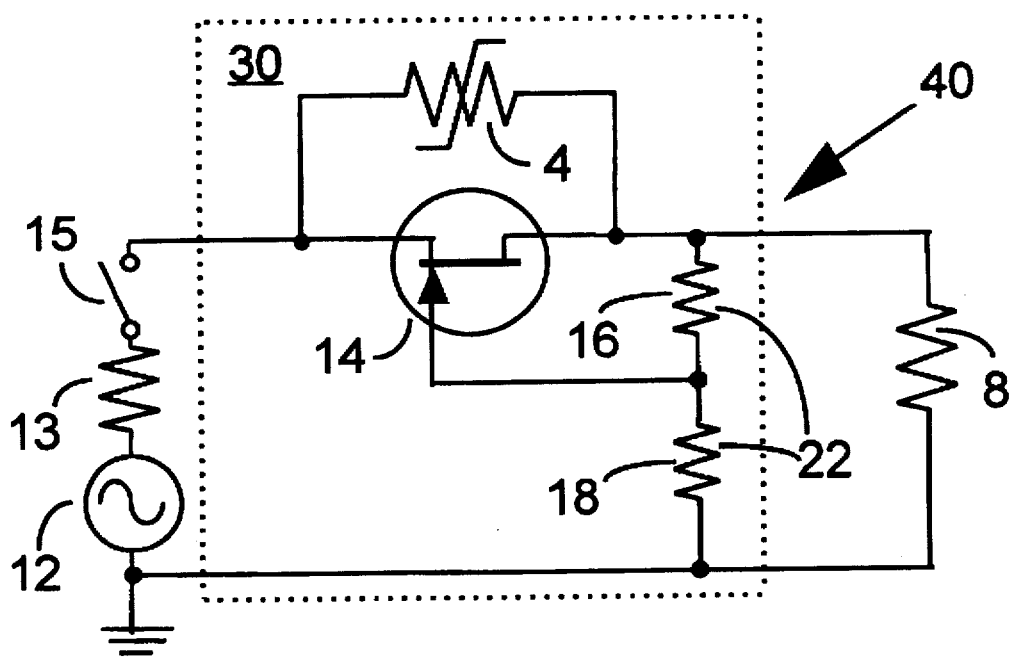

FIG. 3 shows a circuit 20' which is the same as the circuit 20 of FIG. 2 except that the protection system 10' comprises a second set of relay contacts 3 connected between the connection to the relay coil 6 and the connection to the load 8. The relay contacts 3, like the contacts 2, are normally open and are controlled by the relay coil 6. This embodiment has several advantages. One advantage is that the second set of contacts 3 isolates the load 8 from the power source 12 in case of overcurrent. Another advantage is that when power is initially applied, the load 8 is not in the circuit, and the only the current drawn by the relay coil 6 is drawn through the PTC device 4. In addition, the second set of contacts 3 need not interrupt the maximum overcurrent at the applied circuit voltage. Thus, with the PTC device 4 having a high resistance state resistance of $R_{PTC\ HIGH}$, and the circuit 20' having an applied voltage of $V_{APPLIED}$, the second set of relay contacts 3 need only be rated to interrupt a current $I_{INTERRUPT}$ which is less than $V_{APPLIED}/R_{PTC\ HIGH}$ at the voltage $V_{APPLIED}$. The two sets of relay contacts 2, 3 may be arranged to operate simultaneously when the relay coil 6 is deenergized, or operation of the second set of relay contacts 3 may be delayed.

In the overcurrent protection arrangements 10, 10' shown in FIGS. 2 and 3, the relay coil 6 is energized continuously during normal operation, and therefore continuously draws power from the power source 12. A solid state alternative to using a relay is shown in the circuit 40 of FIG. 5. Instead of a relay coil 6 and relay contacts 2, the solid state system 30 comprises a solid state switch, such as a field effect transistor (FET) 14, connected in the line of the circuit 40, with the gate of the FET 14 connected to a voltage divider 22. The voltage divider 22 comprises series connected resistors 16, 18 connected in parallel with the load 8. The solid state arrangement 30 functions in essentially the same manner as does the overcurrent protection arrangement 10 of FIG. 1. At turn on, the FET 14 is initially off until a voltage appears across the load 8 and voltage divider 22 by way of current flowing through the PTC device 4. The voltage appearing at the gate of the FET 14 turns the FET 14 on, thereby allowing current to flow in the circuit 40. If the load 8 is shorted, the resulting undervoltage across the voltage divider 22 causes the FET 14 to turn off. The current is then diverted to the PTC device 4 which trips to its high resistance state. The combination of the FET 14 and PTC device 4 permits the use of an FET 14 rated to switch the overcurrent at a voltage substantially less than the normal circuit voltage.

The solid state arrangement 30 has an advantage over the relay overcurrent protection arrangement 10 in that the values of the two resistors 16, 18 can be selected to present a much higher impedance than that of the relay coil 6, thereby consuming much less power than that consumed by the relay coil 6. The solid state arrangement 30 has the additional potential advantages of longer life, lower cost and smaller size. Other solid state switching devices such as bipolar transistors, triacs, and silicon controlled rectifiers may be used in place of the FET.

What is claimed is:

1. An electrical system which can be connected between an electrical power supply and an electrical load to form an operating circuit, and which when so connected protects the circuit from overcurrents, which system comprises:
   a. a circuit interruption element which, in the operating circuit, is connected in series between the electrical power supply and the electrical load, and which has
      (1) a closed state which permits the flow of a normal current, $I_{NORMAL}$, through the circuit interruption element, and
      (2) an open state which permits the flow of at most a reduced current, substantially less than $I_{NORMAL}$, through the circuit interruption element;
   b. a control element which, in the operating circuit, is connected in parallel with the load, and which has
      (1) (i) an on state, when the voltage across the control element is a normal voltage, $V_{NORMAL}$, and
      (ii) is converted to an off state, when the voltage across the control element falls to a value $V_{VAULT}$, or less, and
      (2) is functionally linked to the circuit interruption element so that when the control element is in the on state, the circuit interruption element is in the closed state, and when the control element is in the off state, the circuit interruption element is in the open state; and
   c. a bypass element which
      (1) is connected in parallel with the circuit interruption element, and
      (2) has
         (i) a start-up state such that, if the circuit interruption element is in the open state and a current $I_{NORMAL}$ is passed through the bypass element, the voltage across the control element is greater than $V_{FAULT}$, and
         (ii) a stopped state such that if the circuit interruption element is in the open state as a result of the voltage across the control element having fallen to a value $V_{FAULT}$ or less, the current through the bypass element is such that the voltage across the control element remains at a value of $V_{FAULT}$ or less.

2. A system according to claim 1, wherein
   a. the control element comprises a relay coil, which
      (1) is energized when the voltage across the relay coil is $V_{NORMAL}$, and
      (2) is deenergized, when the voltage across the relay coil falls to a value $V_{FAULT}$ or less; and
   b. the circuit interruption element comprises a set of relay contacts which are coupled with the relay coil, and which
      (1) are closed when the relay coil is energized, and
      (2) are open when the relay coil is deenergized.

3. A system according to claim 1, wherein
   a. the circuit interruption element comprises a field effect transistor (FET), comprising a gate, a source, and a drain, which
      (1) will allow the normal circuit current, $I_{NORMAL}$, to pass when the gate voltage of the FET is a normal gate voltage, and
      (2) will switch to permit the flow of at most a reduced current, substantially less than $I_{NORMAL}$, when the gate voltage of the FET falls below the normal gate voltage by a predetermined gate voltage amount; and
   b. the control element comprises a voltage divider which determines the gate voltage of the FET.

4. A system according to claim 1 wherein the bypass element is a PTC device.

5. A system according to claim 4 wherein the bypass element is a polymeric PTC device.

6. A system according to claim 1 which comprises a second circuit interruption element which, in the operating circuit, is connected in series with the load, between the load and the control element, and which
   a. has
      (1) a closed state which permits the flow of a normal current, $I_{NORMAL}$, through the load, and
      (2) an open state which permits the flow of at most a reduced current, substantially less than $I_{NORMAL}$, through the load; and
   b. is in said closed state when the control element is in the on state, and is in said open state when the control element is in the off state.

7. An electrical circuit, comprising an electrical power supply, an electrical load, and an electrical protection system which protects the electrical circuit from overcurrents, which system comprises:
   a. circuit interruption element which is connected in series between the electrical power supply and the electrical load, and which has
      (1) a closed state which permits the flow of a normal current, $I_{NORMAL}$, through the circuit interruption element, and
      (2) an open state which permits the flow of at most a reduced current, substantially less than $I_{NORMAL}$, through the circuit interruption element;
   b. a control element which is connected in parallel with the load, and which has
      (1) (i) an on state, when the voltage across the control element is a normal voltage, $V_{NORMAL}$, and
      (ii) is converted to an off state, when the voltage across the control element falls to a value $V_{FAULT}$, or less, and (2) is functionally linked to the circuit interruption element so that when the control element is in the on state, the circuit interruption element is in the closed state, and when the control element is in the off state, the circuit interruption element is in the open state; and c. a bypass element which
   (1) is connected in parallel with the circuit interruption element, and
   (2) has
      (i) a start-up state such that, if the circuit interruption element is in the open state and a current $I_{NORMAL}$ is passed through the bypass element, the voltage across the control element is greater than $V_{FAULT}$, and
      (ii) a stopped state such that if the circuit interruption element is in the open state as a result of the voltage across the control element having fallen to a value $V_{FAULT}$ or less, the current through the bypass element is such that the voltage across the control element remains at a value of $V_{FAULT}$ or less.

8. A circuit according to claim 7, wherein
   a. the control element comprises a relay coil, which
      (1) is energized when the voltage across the relay coil is $V_{NORMAL}$, and
      (2) is deenergized, when the voltage across the relay coil falls to a value $V_{FAULT}$ or less; and
   b. the circuit interruption element comprises a set of relay contacts which are coupled with the relay coil, and which
      (1) are closed when the relay coil is energized, and
      (2) are open when the relay coil is deenergized.

9. A circuit according to claim 7, wherein
   a. the circuit interruption element comprises a field effect transistor (FET), comprising a gate, a source, and a drain, which
      (1) will allow the normal circuit current, $I_{NORMAL}$, to pass when the gate voltage of the FET is a normal gate voltage, and
      (2) will switch to permit the flow of at most a reduced current, substantially less than $I_{NORMAL}$, when the gate voltage of the FET falls below the normal gate voltage by a predetermined gate voltage mount; and
   b. the control element comprises a voltage divider which determines the gate voltage of the FET.

10. A circuit according to claim 7 wherein the bypass element is a PTC device.

11. A circuit according to claim 10 wherein the bypass element is a polymeric PTC device.

12. A circuit according to claim 7 which comprises a second circuit interruption element which is connected in series with the load, between the load and the control element, and which
   a. has
      (1) a closed state which permits the flow of a normal current, $I_{NORMAL}$, through the load, and
      (2) an open state which permits the flow of at most a reduced current, substantially less than $I_{NORMAL}$, through the load; and
   b. is in said closed state when the control element is in the on state, and is in said open state when the control element is in the off state.

* * * * *

UNITED STATES PATENT AND TRADEMARK OFFICE
CERTIFICATE OF CORRECTION

PATENT NO. : 5,666,254

DATED : Brian Thomas, Hugh Duffy

INVENTOR(S) : September 9, 1997

It is certified that error appears in the above-identified patent and that said Letters Patent is hereby corrected as shown below:

Claim 9, line 11, (Column 8, line 11) replace "mount" by --amount--.

Signed and Sealed this

Tenth Day of March, 1998

Attest:

BRUCE LEHMAN

Attesting Officer    Commissioner of Patents and Trademarks